Sept. 7, 1948.   J. H. BUCKNAM   2,448,657
FULLY AUTOMATIC DESURFACING CONTROL SYSTEM
Filed Aug. 28, 1945
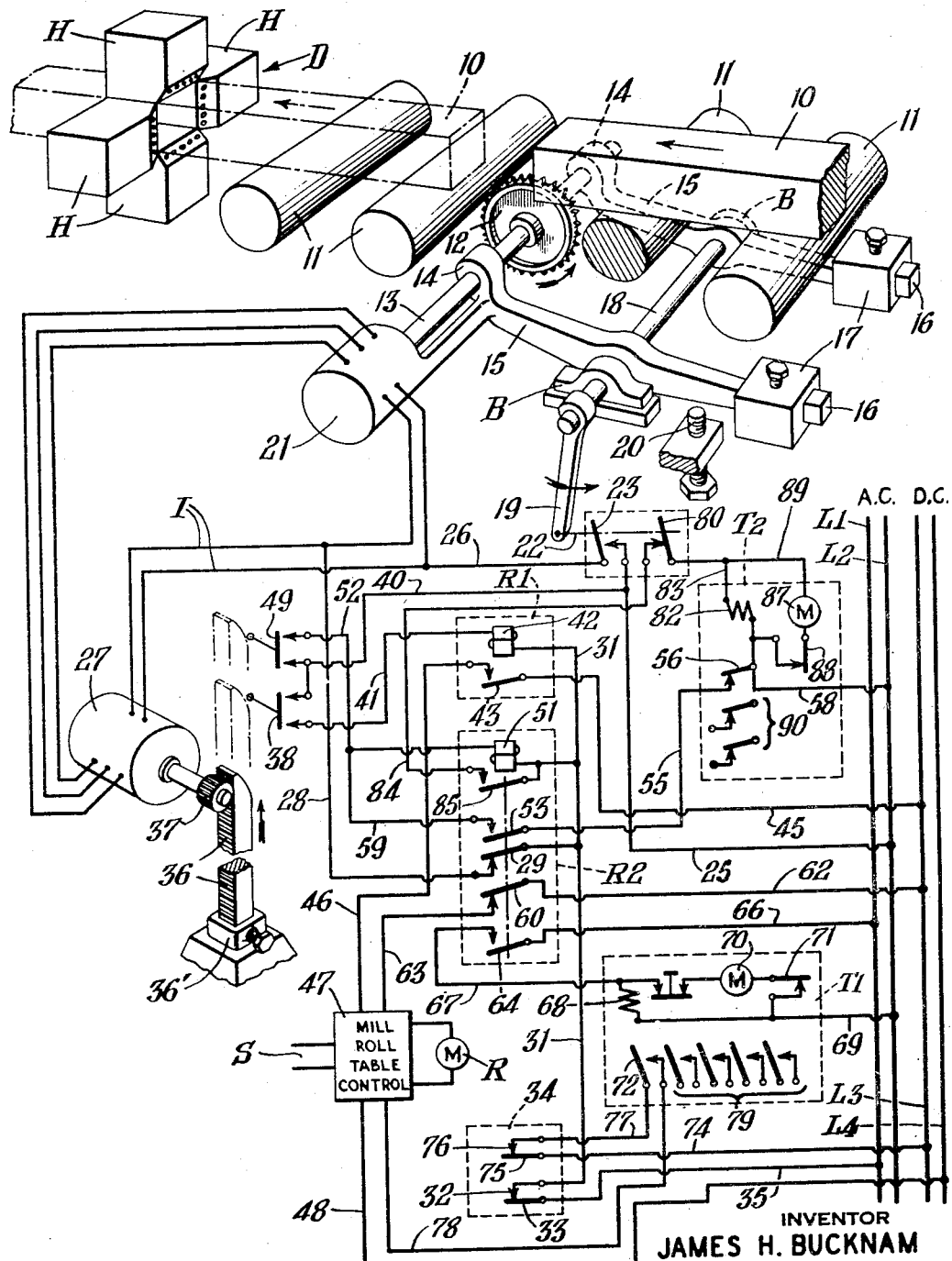
INVENTOR
JAMES H. BUCKNAM
BY
Donald C. Harrison
ATTORNEY Patented Sept. 7, 1948

2,448,657

UNITED STATES PATENT OFFICE 2,448,657

FULLY AUTOMATIC DESURFACING CONTROL SYSTEM

James H. Bucknam, Cranford, N. J., assignor to The Linde Air Products Company, a corporation of Ohio Application August 28, 1945, Serial No. 613,183

4 Claims. (Cl. 266—23)

This invention relates to automatic control systems for thermally treating metal bodies, and more particularly for thermochemically removing surface metal from ferrous metal bodies on any suitable type of conveyor such, for example, as the roll table of a rolling mill.

The main object of the invention is to provide a fully automatic system for controlling all of the various functions required in positioning and desurfacing metal bodies which is efficient and effective in operation, and simple and economical in its parts.

Heretofore, it has been necessary to employ an experienced desurfacing machine operator to take over the control of the roll table from the rolling mill operator so that, as the body to be desurfaced approaches the desurfacing machine, the forward end of the body is properly positioned in the desurfacing machine. This operation in itself requires skilled manipulation of the roll table, and consumes appreciable time. When the body has been properly positioned with respect to the desurfacing machine, the desurfacing heads—usually one for each side of the body—are moved into contact with the body; and preheating gases, desurfacing oxygen, and slag deflecting water are turned on; and the roll table and body are started, advancing the body at desurfacing speed.

When the trailing end of the body being desurfaced approaches the desurfacing machine, the desurfacing machine operator manually turns off all gases, slag water, etc., and returns the control of the roll table over to the mill operator situated at some remote point along the roll table. While the foregoing manual method of control is obviously operable, variation in the quality of the product frequently occurs because of the personal element and occasionally serious damage to the desurfacing machine results from improper timing of the operating cycle.

More recent desurfacing machines have been equipped with a semi-automatic control system by which the actual desurfacing operations are automatically timed in proper sequence and through which materially improved and more uniform results have been obtained. However, such system is not entirely automatic and is also subject to undesirable variations in operation depending upon the skill of the operator, especially in the positioning of the bodies for desurfacing. One aim of the present invention is, therefore, to provide means for making the entire operation of a desurfacing machine and roll table fully automatic and to eliminate all variations in machine operation due to the human element. In the fully automatic control system of the invention, the presence of an operator at the desurfacing machine is required only to observe that the desurfacing operation proceeds satisfactorily.

Automatic control of the roll table and desurfacing for all operations throughout the entire length of the body is accomplished, according to the invention, by locating a detector such as a floating toothed or spiked wheel at a station several feet ahead of the desurfacing station. Providing a floating or pivotable support for the toothed wheel insures positive contact between the toothed wheel and body, and positive actuating means for an electrical control circuit. Thus when the bar contacts the toothed wheel, the latter is shifted and such movement closes an electrical pilot circuit for initiating all of the subsequent functions.

With the fully automatic control system the bar advances toward the desurfacing machine at full roll table speed. When the forward end of the body contacts the toothed wheel, the wheel is forced down, thereby closing an electrical circuit to a pair of Selsyn motors, one of which is connected to the shaft of the toothed wheel, and will be referred to as a transmitter, and the other, which will be referred to as a receiver, is connected to a pinion meshing with a rack located at some remote point. These two Selsyns, when energized, synchronize the rotation of the pinion meshing with the rack with the rotation of the toothed wheel contacting the bar.

Disconnecting the two Selsyn motors electrically is identical to disengaging a mechanical clutch, in that one member is free to rotate independent of the other. At one point during the operating cycle, the two Selsyn units are disconnected electrically, thus permitting the rack to return by gravity to the starting point.

The location of the detector station with respect to the desurfacing machine is fixed, as well as the length of the rack, hence for a given number of revolutions of the toothed wheel, the rack will be driven a predetermined distance, i. e., when the two Selsyn units are energized. When the forward end of the body approaches the desurfacing machine, the rack, serving as a cam, will have been driven by the receiver Selsyn a sufficient distance to close an electrical circuit which will slow down the mill roll table. The body will continue to advance toward the desurfacing machine at reduced speed until the end of the body has arrived at the preheating or starting position within the desurfacing machine.

At such point in the operating cycle, the roll table will stop and a first electric sequence timer causes the desurfacing heads to move into contact with the body, the body to dwell for preheating, preheating and desurfacing gases, etc., to be turned on and the roll table and body started in motion at desurfacing speed.

The body will continue to advance through the desurfacing machine and be desurfaced until the rearward end of the body has passed over the toothed wheel, at which point a pilot electrical circuit actuated by the toothed wheel floating member will start a second electric sequence timer. Occasionally the rearward end of a body being desurfaced will be slightly larger because of "fish tail" or split ends and this necessitates retracting the desurfacing heads before the rearward end of the body passes through the machine. The second sequence timer is adjusted at a predetermined interval, dependent upon the speed of the roll table and the distance between the detector and the nozzles on the desurfacing machine, so that just before the rearward end of the body reaches the desurfacing machine, the desurfacing heads are retracted, the preheat and desurfacing gases are shut off and the roll table controls are disconnected. Disconnecting the roll table controls automatically returns them to the normal mill system.

In the drawing the single figure is a view partly in perspective, of a desurfacing control system exemplifying the invention.

Referring to the drawing, the metal body to be desurfaced, such as a bar 10, is supported on and driven by rolls 11 of a steel mill roll table. A toothed wheel 12 is keyed to a shaft 13 which is journaled in bearings 14 of arms 15, the rearward ends of which are provided with projections 16 carrying slidably attached counterweights 17. A shaft 18 is keyed to the arms 15 and to an electrical switch actuating finger 19. The shaft 18 is journaled in pillow block bearings B. The counterweights 17 hold a section of the toothed wheel 12 slightly above the surface of the rolls 11, when no body is located on the roll table directly above the wheel 12. Upward movement of the wheel 12 is limited by an adjustable stop 20 disposed under the projection 16 of one of the arms 15.

When the bar 10 passes over the toothed wheel 12, the toothed wheel is rotated and depressed flush with the top surface of rolls 11, thereby rotating shaft 13 and a Selsyn transmitter unit 21, which may be mounted as shown on the near arm 15. If desired, a flexible shaft may be provided between shaft 13 and that of unit 21, and the latter may be mounted on a stationary base, removed from the table. Depressing toothed wheel 12 also partially rotates shaft 18 a small amount which moves the finger 19 into engagement with a limit switch member 22 and initiates the first step of the automatic control.

Contact actuating finger 19 when partially rotated, as indicated by the arrow, closes a normally open limit switch 23 completing a circuit from an alternating current supply line L2 through connections 25 and 26 to the Selsyns 21 and 27, and from the Selsyns to line L1 through a connection 28, a normally closed switch 29, a connection 31, contacts 32 and 33 in a transfer switch 34 and connection 35 to line L1. Thus, the input circuit I of the Selsyn system is energized. Selsyn receiver 27 is now synchronized with Selsyn transmitter 21, the rotor of which rotates with the toothed wheel 12 and a vertical rack 36, suitably guided for vertical movement.

A bumper 36' or stop is provided to support the rack at its lowest position, so that the pinion 37 never is disengaged from the rack. The pinion 37, driven by the rotor of Selsyn receiver 27, thus is rotated until the upper end of the rack engages and closes a normally open switch 38, completing a circuit from line L2 through connections 25 and 40, switch 38, a connection 41 to relay coil 42 of a relay R1, and connection 31, contacts 32 and 33 and connection 35 to line L1.

Closing switch 38 thus energizes relay coil 42 which closes normally open switch 43, completing a circuit from a direct current supply line L3, through connections 45 and 46 to a mill roll table control 47, and connection 48 to line L4, thereby slowing down the speed of the mill roll table driving motor R. This, in turn, reduces the speed of the bar 10. The rack 36, however, will continue to rise as the bar continues to rotate toothed wheel 12 and, when the front end of the bar 10 has reached the desired preheating position (which has been previously determined) the rack 36 will engage and close a normally open switch 49, and energize relay coil 51 of a relay R2 from line L2, through connections 25 and 40, switch 49, connection 52 to relay coil 51, connection 31, contacts 32 and 33, and connection 35 to line L1.

Energizing the relay coil 51 of relay R2 opens the normally closed switch 29 and de-energizes the input circuit I of Selsyns 21 and 27, thereby causing the rack 36 to return by gravity to the starting position for the next operating cycle. Relay R2 is held in (energized) by a normally open switch 53, connection 55, a normally closed switch 56 in a sequence timer T2, connection 58 to line L2, connection 59, coil 51, connection 31, contacts 32 and 33, and connection 35 to line L1. Opening of normally closed switch 60 of relay R2 serves to stop the roll table driving motor R so that the front end of the bar 10 is in the desired preheating position in the desurfacing machine D. The circuit for switch 60 is through connection 62 from supply line L3, connection 63 to the mill roll table control 47, and connection 48 to supply line L4. The control 47 is connected to a suitable electrical supply source S and to the roll table motor R.

Normally open switch 64 is also closed and through connection 66 from line L1, connection 67, clutch coil 68, and connection 69 to line L2, starts a synchronous timing motor 70 in timer T1 through a switch 71. After a predetermined time, a switch 72 of timer T1 is closed, completing a circuit to the mill roll table control 47 through connection 74 from line L3, contacts 75 and 76 in the transfer switch 34, connection 77, and connection 78, thereby starting the roll table driving motor R which advances the bar 10 at the desired desurfacing speed. Prior to starting the roll table for desurfacing the bar, a plurality of contacts 79 in timer T1 are operated in a preselected sequence to perform the following functions.

1. Close the desurfacing units H around the bar 10.
2. Turn on the preheating gases and set up the speed selection controls for the desurfacing speed.
3. Turn on the slag deflecting water.
4. Turn on the desurfacing oxygen.

The clutch coil 68 remains energized and continues the desurfacing operation until the sequence timer T2 is energized at which time the entire desurfacing operation will be completed as follows:

When the end of the bar 10 being desurfaced passes over the toothed wheel 12, the wheel will be raised above the top surface of the rolls 11, by the counterweights 17 and the finger 19 will move in a direction opposite to that shown by the arrow, thus causing normally closed switch 80 to close, and normally open switch 23 to re-open. Closing switch 80 completes a circuit from line L2, connection 58, clutch coil 82 in timer T2, connection 83, connection 84, switch 85 of relay R2, connection 31, contacts 32 and 33 of the transfer switch 34, and connection 35 to line L1, starting the synchronous timing motor 87 of timer T2 through its switch 88, and connection 89.

The timing motor 87 of timer T2 operates normally closed contacts 90, which are connected through suitable circuits to contacts 79 of timer T2 and are arranged to open the various electrical circuits in sequence to perform the following functions:

1. Retract the desurfacing heads H from the bar 10 just before the end of the bar passes through the machine. (This is done to prevent damaging the desurfacing machine when the rearward end of the bar is oversized.)

2. Turn off the preheating and desurfacing gases.

3. Turn off the slag water.

4. Stop the roll table after a predetermined time.

After stopping the roll table (number 4 operation above) the relay R2 is de-energized by the opening of switch 56 of timer T2 in the circuit comprising, connection 58 from line L2, connection 55, switch 53, connection 59, relay coil 51 of relay R2, connection 31, contacts 32 and 33 and connection 35 to line L1. De-energized relay R2 opens switch 85 in the circuit comprising clutch coil 82 of timer T2, connections 58, 83 and 84, and returns control of the roll table to the mill operator. The entire electrical circuit and desurfacing machine is now reset to receive a succeeding bar.

The wheel 12 may be located above or on one side of the roll table without departing from the invention. Also, the pinion 37 may be driven by the shaft 13 through a flexible shaft drive, instead of the Selsyn system, such drive being provided with a magnetically operated clutch controlled by the circuit I.

What is claimed is:

1. In an automatic control system for thermally treating a metal body on a conveyor, the combination comprising, detector means including a wheel operable by the body as it is advanced by the conveyor, means including a switch responsive to the operation of said detector means for changing the speed of the advancing movement of said body, and means including a Selsyn system driven by said wheel so as to be responsive to the advancing movement of the body at such speed for adjusting such movement for starting treatment when the body is in proper position for starting the thermal treatment thereof.

2. In an automatic control system for thermally treating a metal body on a mill roll table, the combination comprising, a toothed wheel engageable with a longitudinal surface of the metal body as it is advanced by the roll table, means supporting said wheel for transverse movement with respect to the path of such surface, limit switch means responsive to such movement comprising a starting switch and a finishing switch, a Selsyn system including a Selsyn transmitter unit driven by said wheel, a Selsyn receiver unit, and an input circuit comprising said starting switch for electrically energizing said Selsyn units when the front end of said body passes said wheel, a vertical rack connected to be elevated by said receiver unit in synchronism with the forward movement of the body surface in engagement with said wheel, means including a work slow-down switch operable by said rack when it is elevated to a first position for reducing the speed of advance of said body by the roll table, means including a work-stop switch operable by said rack when it is elevated to a second position for stopping the advance of said body by the roll table, a self-locking relay energized by the operation of said work-stop switch, said relay having switch means for electrically de-energizing said Selsyn system when said work-stop switch is operated so that the rack returns by gravity to its starting position, a first sequence timer responsive to the energization of said relay for starting the thermal treatment of the body at the front end thereof and causing the roll table to advance said body so that it is progressively treated, and a second sequence timer responsive to the operation of said finishing switch when the trailing end of the body passes said wheel for stopping such thermal treatment of the body and restoring the control system to its original state.

3. In a fully automatic desurfacing control system, the combination of a desurfacing station, a body detector station located in front of said desurfacing station, limit switch means, body responsive means for operating said limit switch means as long as any transverse section of a body is in said detector station in front of the desurfacing station, a Selsyn system including a transmitter and a receiver having an input coupling circuit controlled by said limit switch means, means driven by the body for driving said transmitter in accordance with the longitudinal movement of such body through said detector station, gravity loaded means driven by said receiver when said input circuit is energized by the operation of said limit switch means, means including a slow-down switch operated by said gravity loaded means for reducing the speed of said body, means including a stop switch operated by said gravity loaded means for subsequently stopping said body after it has been advanced at reduced speed into starting position in said desurfacing station, and means responsive to the operation of said stop switch for de-energizing said input circuit so that said gravity loaded means is returned to its normal position.

4. In an automatic control system for thermally treating a metal body on a conveyor, the combination comprising, a toothed wheel engageable with a longitudinal surface of the metal body as it is advanced by the conveyor, means supporting said wheel for transverse movement with respect to the path of such surface, limit switch means responsive to such movement comprising a starting switch and a finishing switch, a Selsyn system including a Selsyn transmitter unit driven by said wheel, a Selsyn receiver unit, and an input circuit comprising said starting switch for electrically energizing said Selsyn units when the front end of said body passes said wheel, a rack connected to be moved by said receiver unit in synchronism with the forward movement of the body surface in engagement with said wheel, means including a work slow-down switch operable by said rack when it is moved to a first position for reducing the speed of advance of said body by the roll table, means including a work-stop switch operable by said rack when it moved to a second position for stopping the advance of said body by the roll table, a self-locking relay energized by the operation of said work-stop switch, said relay having switch means for electrically de-energizing said Selsyn system when said work-stop switch is operated so that the rack returns to its starting position, a first sequence timer responsive to the energization of said relay for starting the thermal treatment of the body at the front end thereof and causing the conveyor to advance said body so that it is progressively treated, and a second sequence timer responsive to the operation of said finishing switch when the trailing end of the body passes said wheel for stopping such thermal treatment of the body and restoring the control system to its original state.

JAMES H. BUCKNAM.

REFERENCES CITED

The following references are of record in the file of this patent:

UNITED STATES PATENTS

| Number | Name | Date |
|---|---|---|
| 1,380,430 | Smith | June 7, 1921 |
| 1,512,918 | Forsgard | Oct. 28, 1924 |
| 2,016,414 | Cramer | Oct. 8, 1935 |
| 2,025,542 | Lugar | Dec. 24, 1935 |
| 2,136,772 | Free | Nov. 15, 1938 |
| 2,177,276 | Bucknam | Oct. 24, 1939 |
| 2,244,822 | Bucknam | June 10, 1941 |
| 2,273,126 | McGillin | Feb. 17, 1942 |
| 2,293,321 | Underwood et al. | Aug. 18, 1942 |
| 2,299,618 | Finston | Oct. 20, 1942 |
| 2,424,270 | Ehemann, Jr., et al. | July 22, 1947 |